United States Patent
Ahn et al.

(10) Patent No.: US 9,134,514 B2
(45) Date of Patent: Sep. 15, 2015

(54) PHOTOGRAPHIC LENS OPTICAL SYSTEM

(71) Applicant: KOLEN CO., LTD, Seongnam Si (KR)

(72) Inventors: Chi Ho Ahn, Seongnam-si (KR); Jae Hoon Cho, Seongnam-si (KR); Ji Eun Kim, Seongnam-si (KR); Chan Goo Kang, Daejeon (KR); Se Jin Kim, Seoul (KR)

(73) Assignee: KOLEN CO., LTD. (KR)

( * ) Notice: Subject to any disclaimer, the term of this patent is extended or adjusted under 35 U.S.C. 154(b) by 0 days.

(21) Appl. No.: 14/144,866

(22) Filed: Dec. 31, 2013

(65) Prior Publication Data

US 2014/0184895 A1    Jul. 3, 2014

(30) Foreign Application Priority Data

Dec. 31, 2012    (KR) .......................... 10-2012-0158540

(51) Int. Cl.
*G02B 9/34* (2006.01)
*G02B 13/18* (2006.01)

(52) U.S. Cl.
CPC ..................................... *G02B 13/18* (2013.01)

(58) Field of Classification Search
CPC .................................................... G02B 13/004
USPC .......................................................... 359/773
See application file for complete search history.

(56) References Cited

U.S. PATENT DOCUMENTS 7,466,497 B2 * 12/2008 Park et al. ..................... 359/715

FOREIGN PATENT DOCUMENTS

JP     2008158413 A    7/2008
KR    20120067162 A    6/2012

OTHER PUBLICATIONS

Korean Intellectual Property Office Notice of Allowance Application No. 10-2012-0158540 Issued: May 29, 2014.
Korean Intellectual Property Office Notice of Non-Final Rejection Application No. 10-2012-0158540 Jan. 28, 2014 8 pages.

* cited by examiner

*Primary Examiner* — James Jones
(74) *Attorney, Agent, or Firm* — St. Onge Steward Johnston & Reens LLC (57) ABSTRACT

First, second, third, and fourth lenses (in order from an object side) are arranged between the object and an image sensor where an image of the object is formed. The first lens may have a positive refractive power and both surfaces thereof may be convex. The second lens may have a negative refractive power and both surfaces thereof may be concave. The third lens may have a positive refractive power and have a meniscus shape that is convex toward the image sensor. The fourth lens may have a negative refractive power and at least one of an incident surface and an exit surface thereof may be an aspherical surface. A sagittal depth SAG1 of an incident surface of the second lens along an optical axis and a sagittal depth SAG2 of an exit surface of the second lens along the optical axis may satisfy Inequality

|SAG1|>|SAG2|.

17 Claims, 10 Drawing Sheets

PHOTOGRAPHIC LENS OPTICAL SYSTEM

FIELD OF THE INVENTION

The present invention relates to an optical apparatus, and more particularly, to a lens optical system used in a camera.

BACKGROUND OF THE INVENTION

Cameras using a solid state image sensor, such as a charge coupled device (CCD) and a complementary metal oxide semiconductor (CMOS) image sensor, have been rapidly distributed.

To increase the resolution of a camera, a degree of pixel integration of a solid state image sensor is increased. Also, the size and weight of a camera is being reduced through improvement of performance of a lens optical system included in a camera.

In a general lens optical system of a camera, a large number of lenses are used to secure performance of the lens optical system, e.g., to secure a large angle of view and to correct aberration. However, when the lens optical system includes many lenses, it may be difficult to make a compact and lightweight camera.

An existing lens optical system used in camera phones generally has a viewing angle of about 60 to 63 degrees. Also, in a wide angle lens system according to a related art, the size of a first lens that is close to an object is usually the largest.

There is a demand to develop a compact lens optical system having a wide viewing angle and that is able to easily correct aberration.

SUMMARY OF THE INVENTION

The present invention provides a lens optical system that is compact and lightweight and exhibits a wide viewing angle and superior performance.

According to an aspect of the present invention, there is provided a lens optical system including first, second, third, and fourth lenses that are arranged between an object and an image sensor where an image of the object is formed, in order from a side of the object, wherein the first lens has a positive (+) refractive power and both surfaces thereof are convex, the second lens has a negative (−) refractive power and both surfaces thereof are concave, the third lens has a positive (+) refractive power and has a meniscus shape that is convex toward the image sensor, and the fourth lens has a negative (−) refractive power and at least one of an incident surface and an exit surface thereof is an aspherical surface.

The lens optical system may satisfy at least one of the following inequalities 1 to 3.

$$|SAG1|>|SAG2| \qquad \text{<Inequality 1>}$$

where SAG1 is a sagittal depth of an incident surface of the second lens along an optical axis and SAG2 is a sagittal depth of an exit surface of the second lens along the optical axis.

$$0.9<|\tan(\theta/2)|<1.2 \qquad \text{<Inequality 2>}$$

where θ indicates a viewing angle of the lens optical system.

$$1.1<|R1/R2|<1.8 \qquad \text{<Inequality 3>}$$

where R1 is a curvature radius of an incident surface of the first lens, and R2 is a curvature radius of an exit surface of the first lens.

The lens optical system may further satisfy the following inequality 4-1 or inequality 4-2.

$$1.3<f/D4<1.7, \text{ and } BFL>1.5. \qquad \text{<Inequality 4-1>}$$

where f is a focal length of the lens optical system, D4 is an effective radius of an exit surface of the fourth lens, and BFL is a distance from the exit surface of the fourth lens to the image sensor.

$$1.0<f/D4<1.3, \text{ and } BFL<1.5. \qquad \text{<Inequality 4-2>}$$

where f is a focal length of the lens optical system, D4 is an effective radius of an exit surface of the fourth lens, and BFL is a distance from the exit surface of the fourth lens to the image sensor.

At least one of the first to third lenses may be an aspherical lens.

At least one of an incident surface and an exit surface of at least one of the first to third lenses may be an aspherical surface.

At least one of an incident surface and an exit surface of the fourth lens may have at least one inflection point between a center portion and an edge thereof.

The incident surface of the fourth lens may be convex toward the object at the center portion thereof and concave toward the object around the center portion.

The exit surface of the fourth lens may be concave toward the image sensor at the center portion thereof and convex toward the image sensor around the center portion.

The second, third, and fourth lenses may be aberration correction lenses.

The lens optical system may further include an aperture diaphragm between the object and the image sensor.

The aperture diaphragm may be disposed between the object and the first lens.

The lens optical system may further include an infrared blocking unit between the object and the image sensor.

The infrared blocking unit may be disposed between the fourth lens and the image sensor.

At least one of the first to fourth lenses may be a plastic lens.

A viewing angle (θ) of the lens optical system may be about 85° or greater.

According to another aspect of the present invention, there is provided a lens optical system comprising first, second, third, and fourth lenses that are arranged between an object and an image sensor where an image of the object is formed, in order from a side of the object, wherein the first, second, third, and fourth lenses have positive (+), negative (−), positive (+), and negative (−) refractive powers, respectively, and wherein the lens optical system satisfies the following inequalities.

Inequality: $|SAG1|>|SAG2|$

Inequality: $|R1|>|R2|$ where SAG1 is a sagittal depth of an incident surface of the second lens along an optical axis, SAG2 is a sagittal depth of an exit surface of the second lens along the optical axis, R1 is a curvature radius of an incident surface of the first lens, and R2 is a curvature radius of an exit surface of the first lens.

The lens optical system may further satisfy the following inequality 4-1.

$$1.3<f/D4<1.7, \text{ and } BFL>1.5, \qquad \text{<Inequality 4-1>}$$

where f is a focal length of the lens optical system, D4 is an effective radius of an exit surface of the fourth lens, and BFL is a distance from the exit surface of the fourth lens to the image sensor.

The lens optical system may further satisfy the following inequality 4-2.

$$1.0<f/D4<1.3, \text{ and } BFL<1.5, \qquad \text{<Inequality 4-2>}$$

where f is a focal length of the lens optical system, D4 is an effective radius of an exit surface of the fourth lens, and BFL is a distance from the exit surface of the fourth lens to the image sensor.

The first lens may be a biconvex lens.

The second lens may be a biconcave lens.

The third lens may be convex toward the image sensor.

The fourth lens may be an aspherical lens. At least one of an incident surface and an exit surface of the fourth lens may have at least one inflection point between a center portion and an edge thereof.

A viewing angle ($\theta$) of the lens optical system may be about 85° or greater.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIGS. 1 through 5 are sectional views illustrating an arrangement of main elements of lens optical systems according to first through fifth embodiments of the present invention.

Referring to FIGS. 1 through 5, each of the lens optical systems according to embodiments of the present invention may include a first lens I, a second lens II, a third lens III, and a fourth lens IV that are arranged between an object OBJ and an image sensor IMG where an image of the object OBJ is formed, in order from a side of the object OBJ. The first lens I may have a positive (+) refractive power. An incident surface 2* of the first lens I may be convex toward the object OBJ, whereas an exit surface 3* of the first lens I may be convex toward the image sensor IMG. Accordingly, the first lens I may be a biconvex lens. The second lens II may have a negative (−) refractive power and may be a biconcave lens, that is, both of an incident surface 4* and an exit surface 5* may be concave. The third lens III may have a positive (+) refractive power and may be a meniscus lens that is convex toward the image sensor IMG. At least one of the first to third lenses I to III may be an aspherical lens. In other words, at least one of the incident surface 2*, 4*, or 6* and the exit surface 3*, 5*, or 7* of at least one of the first to third lenses I to III may be aspherical. For example, all incident surfaces 2*, 4*, and 6* and the exit surfaces 3*, 5*, and 7* of the first to third lenses I to III may be aspherical.

The fourth lens IV may have a negative (−) refractive power, and at least one of an incident surface 8* and an exit surface 9* of the fourth lens IV may be an aspherical surface. For example, at least one of the incident surface 8* and the exit surface 9* of the fourth lens IV may be an aspherical surface having at least one inflection point between a center portion and an edge thereof. The incident surface 8* of the fourth lens IV may be convex toward the object OBJ at the center portion thereof and concave toward the object OBJ around the center portion. The exit surface 9* of the fourth lens IV may be concave toward the image sensor IMG at the center portion thereof and convex toward the image sensor IMG around the center portion. The first lens I may have a relatively strong positive (+) refractive power, and the second to fourth lenses II to IV may serve as aberration correction lenses.

Each of the lens optical systems according to embodiments of the present invention may further include an aperture diaphragm S1 and an infrared blocking unit V. The aperture diaphragm S1 may be provided at a side of the first lens I toward the object OBJ, that is, between the object OBJ and the first lens I. The infrared blocking unit V may be provided between the fourth lens IV and the image sensor IMG. The infrared blocking unit V may be an infrared blocking filter. The locations of the aperture diaphragm S1 and the infrared blocking unit V may vary.

The lens optical systems according to embodiments of the present invention configured as above may satisfy at least one of Inequalities 1 to 3.

$$|SAG1| > |SAG2| \qquad \text{[Inequality 1]}$$

Figure 6:
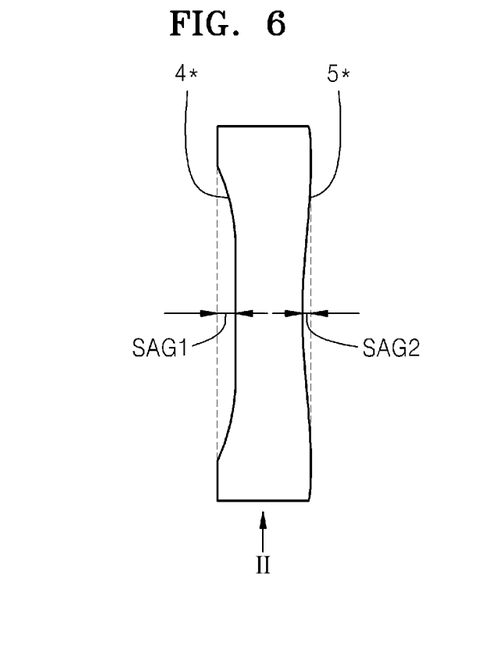
FIG. 6 is a cross-sectional view illustrating a second lens used in a lens optical system for explaining sagittal depths (SAGs) of an incident surface and an exit surface of the second lens, according to an embodiment of the present invention.

Here, SAG1 is a sagittal depth of the incident surface 4* of the second lens II along an optical axis, and SAG2 is a sagittal depth of the exit surface 5* of the second lens II along the optical axis. In other words, SAG1 is a distance from a tangential plane drawn at an edge portion of the incident surface 4* to an apex of the incident surface 4* along the optical axis, and SAG2 is a distance from a tangential plane drawn at an edge portion of the exit surface 5* to an apex of the exit surface 5* along the optical axis. The edge portions mean end parts of effective lens regions, i.e., effective radius regions at the incident and exit surfaces 4* and 5*. That is, SAG1 and SAG2 may be shown in FIG. 6.

Inequality 1 shows a condition for shaping the second lens II and means that the sagittal depth SAG1 of the incident surface 4* of the second lens II is greater than the sagittal depth SAG2 of the exit surface 5* of the second lens II. More specifically, embodiments of the present invention may satisfy Inequality "1.0<|SAG1/SAG2|<12". When this Inequality (Inequality 1) is satisfied, a compact optical system having a wide viewing angle required in the present invention may be implemented.

$$0.9 < |\tan(\theta/2)| < 1.2 \quad \text{[Inequality 2]}$$

Here, θ is a viewing angle of the lens optical system.

Inequality 2 shows a condition for determining a viewing angle of the lens optical system. In Inequality 2, when "|tan (θ/2)|" is less than or equal to a lower limit of 0.9, although spherical aberration and coma aberration are decreased, a viewing angle may be decreased as well. In contrast, when the "|tan(θ/2)|" is greater than or equal to an upper limit of 1.2, although the viewing angle is increased, the spherical aberration and coma aberration may be increased. When the condition of Inequality 2 is satisfied, a wide viewing angle, for example, about 85° or greater may be obtained while maintaining the spherical aberration and coma aberration in a good state.

$$1.1 < |R1/R2| < 1.8 \quad \text{[Inequality 3]}$$

Here, R1 is a curvature radius of the incident surface 2* of the first lens I, and R2 is a curvature radius of the exit surface 3* of the first lens I.

Inequality 3 shows a condition for shaping the first lens I. Basically, Inequality 3 means that an absolute value of the curvature radius R1 of the incident surface 2* of the first lens I is greater than an absolute value of the curvature radius R2 of the exit surface 3* of the first lens I. In a general lens system, an absolute value of a curvature radius of an incident surface of a first lens (biconvex lens) is smaller than an absolute value of a curvature radius of an exit surface of the first lens. However, in the current embodiment of the present invention, on the contrary, more specifically, |R1/R2| may have a value of about 1.1 to 1.8. When Inequality 3 is satisfied, a compact optical system having a wide viewing angle may be manufactured.

Also, lens optical systems according to embodiments of the present invention may satisfy the following Inequality 4-1 or 4-2.

$$1.3 < f/D4 < 1.7, BFL > 1.5 \quad \text{[Inequality 4-1]}$$

$$1.0 < f/D4 < 1.3, BFL < 1.5 \quad \text{[Inequality 4-2]}$$

Here, f is a focal length of the entire lens optical system, D4 is an effective radius of the exit surface 9* of the fourth lens IV, that is, a semi-aperture on a Y axis, and BFL is a distance from the exit surface 9* of the fourth lens IV to the image sensor IMG. The BFL is a length on the optical axis.

Figure 1:
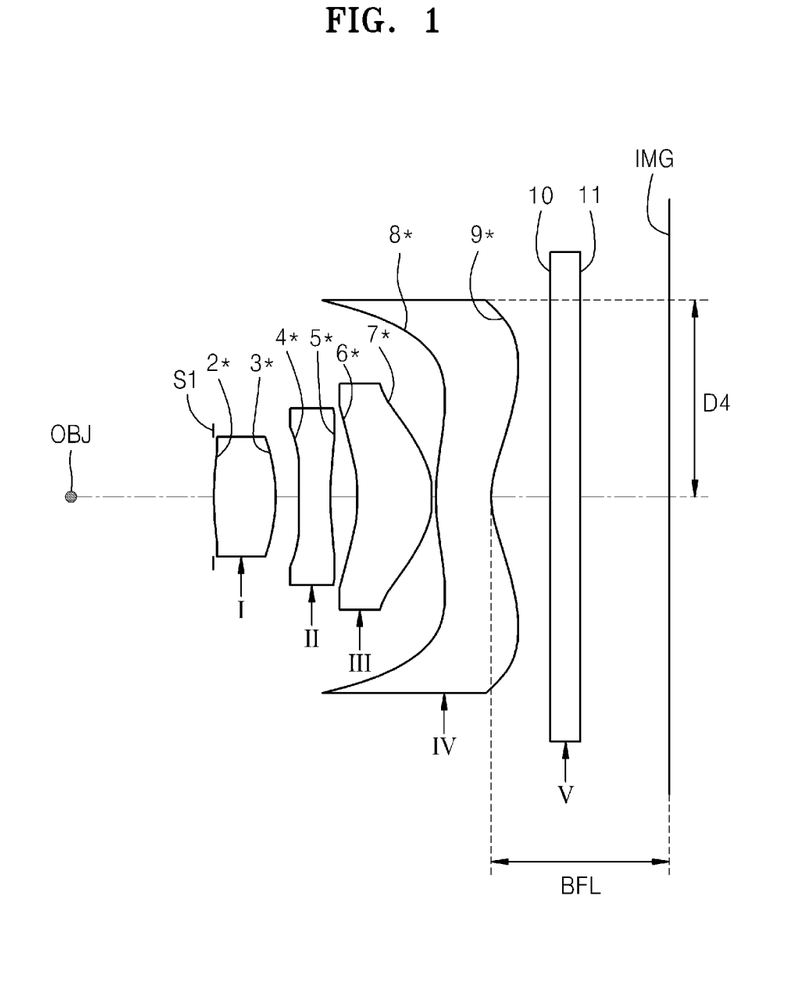
FIGS. 1 through 5 are cross-sectional views illustrating an arrangement of main elements of lens optical systems according to first through fifth embodiments of the present invention.
Figure 2:
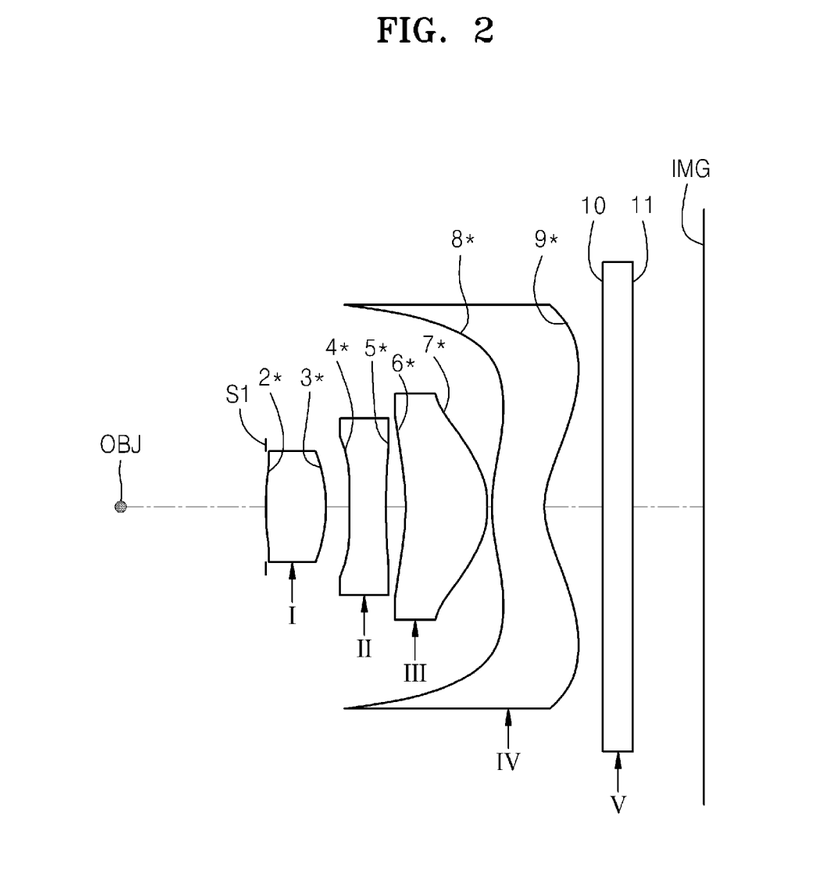
Figure 3:
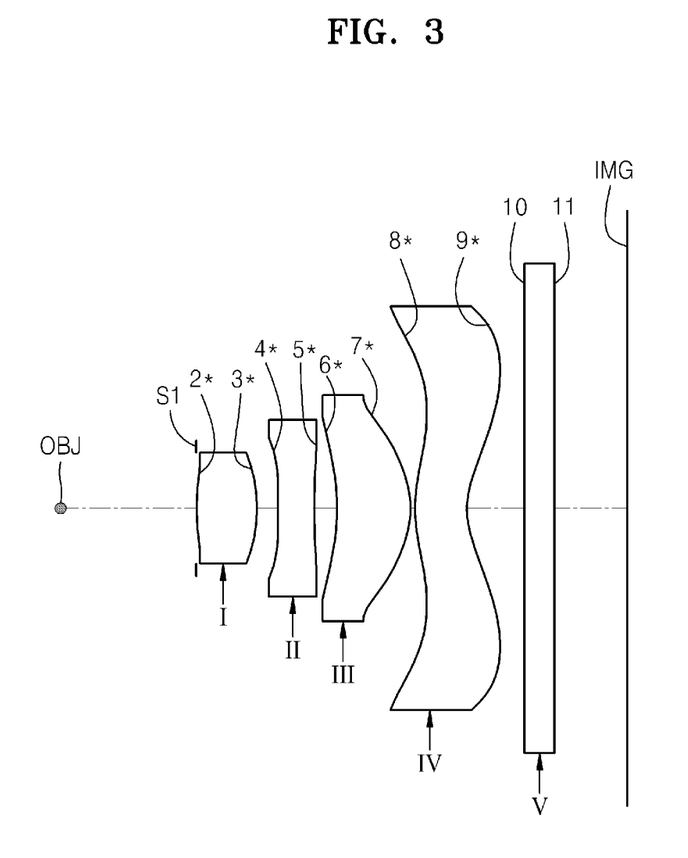
Figure 4:
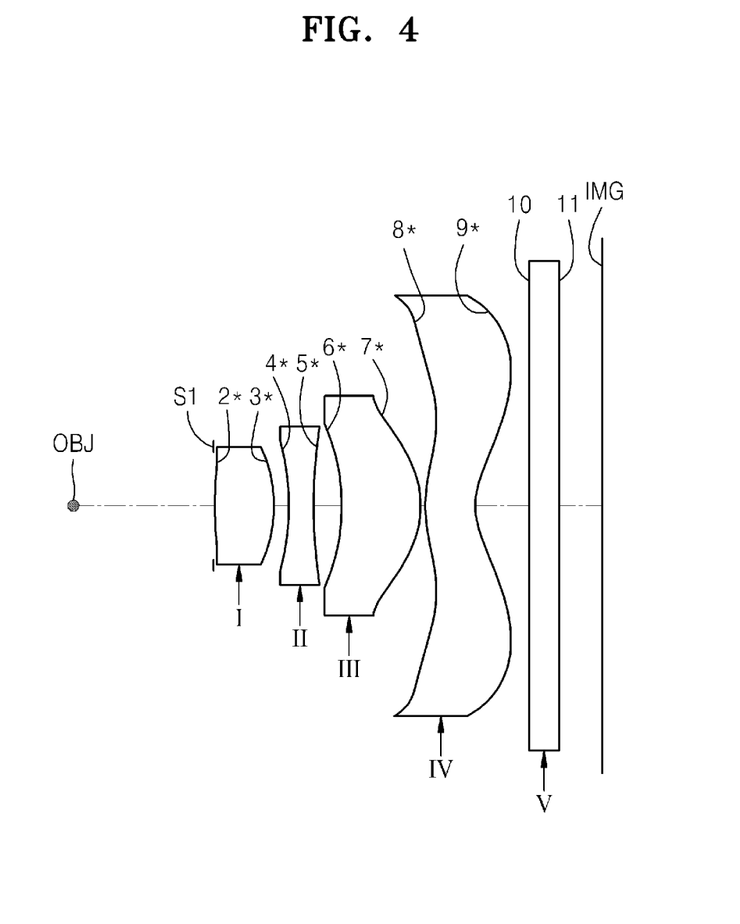
Figure 5:
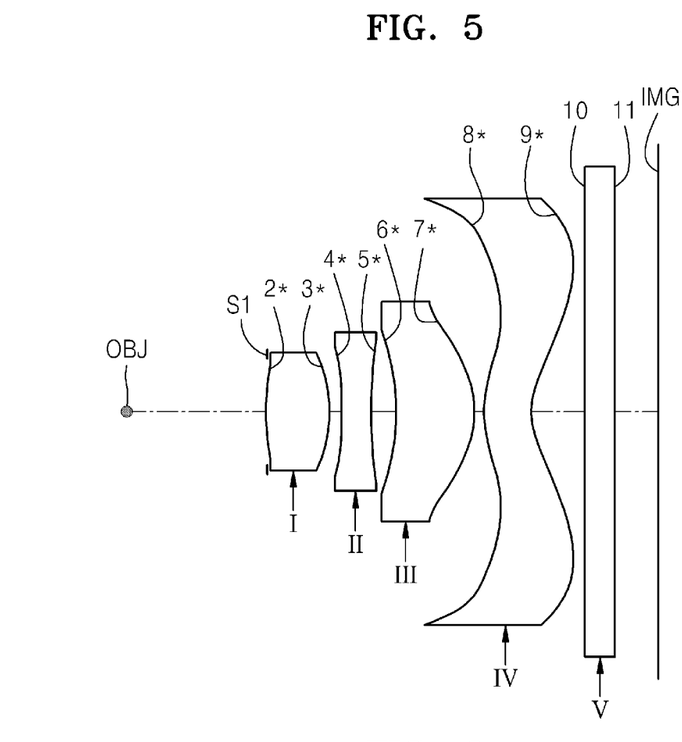

Embodiments of FIGS. 1 through 3, that is, first through third embodiments, satisfy the above Inequality 4-1, and embodiments of FIGS. 4 and 5, that is, fourth and fifth embodiments, satisfy the above Inequality 4-2.

Inequalities 4-1 and 4-2 show conditions for controlling an outer diameter and a length of the lens optical system. More specifically, Inequalities 4-1 and 4-2 are conditional expressions for controlling an outer diameter of the exit surface 9* of the fourth lens IV and a length from the fourth lens IV to the image sensor IMG. Also, Inequalities 4-1 and 4-2 also relate to a viewing angle of the lens optical system. When the viewing angle is increased, the lens optical system becomes compact and the outer diameter of the exit surface 9* of the fourth lens IV, that is, D4×2 is decreased, but BFL may be increased. In contrast, when the viewing angle is decreased, it is difficult to make the lens optical system compact and the outer diameter of the exit surface 9* of the fourth lens IV, that is, D4×2 is increased, but BFL may be decreased. When BFL is greater than 1.5, if "1.3<f/D4<1.7" is satisfied, the total length and outer diameter of the lens optical system may be decreased (FIGS. 1 through 3). Meanwhile, when BFL is less than 1.5, if "1.0<f/D4<1.3" is satisfied, the total length and outer diameter of the lens optical system may be decreased (FIGS. 4 and 5).

In the above-described embodiments of FIGS. 1 through 5 (i.e., the first through fifth embodiments), the values of Inequalities 1 through 3 are shown in Tables 1 through 3. In Tables 1 through 3, the units of "SAG1", "SAG2", "R1", and "R2" are millimeters (mm). In Table 2, the unit of the viewing angle "θ" is a degree (°).

TABLE 1

| Classification | SAG1 | SAG2 | Inequality 1 (|SAG1| > |SAG2|) | 1.0 < |SAG1/SAG2| < 12 |
|---|---|---|---|---|
| 1st Embodiment | 0.085 | 0.024 | satisfied | 3.542 |
| 2nd Embodiment | 0.111 | 0.010 | satisfied | 11.10 |
| 3rd Embodiment | 0.098 | 0.022 | satisfied | 4.455 |
| 4th Embodiment | 0.078 | 0.061 | satisfied | 1.279 |
| 5th Embodiment | 0.078 | 0.063 | satisfied | 1.238 |

TABLE 2

| Classification | θ | Inequality 2 (0.9 < |tan(θ/2)| < 1.2) |
|---|---|---|
| 1st Embodiment | 85.0 | 0.91 |
| 2nd Embodiment | 88.6 | 0.97 |
| 3rd Embodiment | 87.1 | 0.95 |
| 4th Embodiment | 89.0 | 0.98 |
| 5th Embodiment | 89.0 | 0.98 |

TABLE 3

| Classification | R1 | R2 | Inequality 3 (1.1 < |R1/R2| < 1.8) |
|---|---|---|---|
| 1st Embodiment | 3.608 | −2.852 | 1.265 |
| 2nd Embodiment | 3.999 | −2.418 | 1.654 |
| 3rd Embodiment | 3.479 | −2.534 | 1.373 |
| 4th Embodiment | 3.277 | −2.009 | 1.631 |
| 5th Embodiment | 3.261 | −2.013 | 1.620 |

Referring to Tables 1 through 3, the lens optical systems of the above embodiments of FIGS. 1 through 5 may satisfy Inequalities 1 through 3.

In the first through third embodiments (FIGS. 1 through 3), the values of Inequality 4-1 are shown in Table 4. Also, in the fourth and fifth embodiments (FIGS. 4 and 5), the values of Inequality 4-2 are shown in Table 5. In Tables 4 and 5, the units of "f", "D4", and "BFL" are millimeters (mm).

TABLE 4

| Classification | f | D4 | Inequality 4-1 | |
|---|---|---|---|---|
| | | | 1.3 < f/D4 < 1.7 | BFL > 1.5 |
| 1st Embodiment | 3.160 | 1.95 | 1.621 | 1.80 |
| 2nd Embodiment | 2.962 | 2.10 | 1.410 | 1.64 |
| 3rd Embodiment | 3.044 | 2.10 | 1.450 | 1.67 |

TABLE 5

| Classification | f | D4 | Inequality 4-2 1.0 < f/D4 < 1.3 | BFL < 1.5 |
|---|---|---|---|---|
| 4th Embodiment | 2.946 | 2.35 | 1.254 | 1.43 |
| 5th Embodiment | 2.868 | 2.35 | 1.220 | 1.39 |

Referring to Tables 4 and 5, the lens optical systems of the above embodiments of FIGS. 1 through 3 may satisfy Inequality 4-1, and the lens optical systems of the above embodiments of FIGS. 4 and 5 may satisfy Inequality 4-2.

In the lens optical systems according to the above-described embodiments configured as above, the first to fourth lenses I-IV may be formed of plastic in consideration of the shapes and dimensions thereof. In other words, all of the first to fourth lenses I-IV may be plastic lenses. In the case of a glass lens, a manufacturing cost is high and conditions for forming it are strict, and thus it may be difficult to make a compact lens optical system. In the present invention, however, since all of the first to fourth lenses I-IV may be formed of plastic, a variety of advantages according thereto may be obtained. Nevertheless, the materials of the first to fourth lenses I-IV of the present invention are not limited to plastic. If necessary, at least one of the first to fourth lenses I-IV may be formed of glass.

The lens optical systems according to the above-described embodiments of the present invention will be described in detail with reference to lens data and the accompanying drawings.

Tables 6 through 10 each shows curvature radiuses, lens thicknesses or distances between lenses, refractive indexes, and Abbe numbers of lenses constituting the lens optical systems of FIGS. 1 through 5. In Tables 6 to 10, "R" denotes a curvature radius, "D" denotes a lens thickness of a lens interval or a distance between neighboring constituent elements, "Nd" denotes a refractive index of a lens measured by using a d-line, and "Vd" denotes an Abbe number with respect to the d-line. With respect to a lens surface number, the mark * denotes that a lens surface is aspherical. The units of "R" and "D" values are millimeters (mm).

TABLE 6

| 1st Embodiment | Surface | R | D | Nd | Vd |
|---|---|---|---|---|---|
| | S1 | infinity | | | |
| I | 2* | 3.608 | 0.616 | 1.546 | 56.092 |
| | 3* | −2.852 | 0.236 | | |
| II | 4* | −400.000 | 0.323 | 1.638 | 23.524 |
| | 5* | 3.847 | 0.266 | | |
| III | 6* | −1.379 | 0.747 | 1.546 | 56.092 |
| | 7* | −0.775 | 0.040 | | |
| IV | 8* | 2.113 | 0.550 | 1.534 | 55.855 |
| | 9* | 0.845 | 0.600 | | |
| V | 10 | infinity | 0.300 | 1.518 | 64.197 |
| | 11 | infinity | 0.899 | | |
| | IMG | infinity | | | |

TABLE 7

| 2nd Embodiment | Surface | R | D | Nd | Vd |
|---|---|---|---|---|---|
| | S1 | infinity | | | |
| I | 2* | 3.999 | 0.600 | 1.546 | 56.092 |
| | 3* | −2.418 | 0.265 | | |
| II | 4* | −7.858 | 0.374 | 1.638 | 23.524 |
| | 5* | 4.300 | 0.196 | | |
| III | 6* | −1.939 | 0.832 | 1.546 | 56.092 |
| | 7* | −0.845 | 0.040 | | |

TABLE 7-continued

| 2nd Embodiment | Surface | R | D | Nd | Vd |
|---|---|---|---|---|---|
| IV | 8* | 1.727 | 0.550 | 1.534 | 55.855 |
| | 9* | 0.775 | 0.600 | | |
| V | 10 | infinity | 0.300 | 1.518 | 64.197 |
| | 11 | infinity | 0.734 | | |
| | IMG | infinity | | | |

TABLE 8

| 3rd Embodiment | Surface | R | D | Nd | Vd |
|---|---|---|---|---|---|
| | S1 | infinity | | | |
| I | 2* | 3.479 | 0.600 | 1.546 | 56.092 |
| | 3* | −2.534 | 0.241 | | |
| II | 4* | −7.609 | 0.351 | 1.638 | 23.524 |
| | 5* | 4.951 | 0.235 | | |
| III | 6* | −1.715 | 0.777 | 1.546 | 56.092 |
| | 7* | −0.859 | 0.040 | | |
| IV | 8* | 1.723 | 0.550 | 1.534 | 55.855 |
| | 9* | 0.794 | 0.600 | | |
| V | 10 | infinity | 0.300 | 1.518 | 64.197 |
| | 11 | infinity | 0.766 | | |
| | IMG | infinity | | | |

TABLE 9

| 4th Embodiment | Surface | R | D | Nd | Vd |
|---|---|---|---|---|---|
| | S1 | infinity | | | |
| I | 2* | 3.277 | 0.662 | 1.547 | 56.093 |
| | 3* | −2.009 | 0.164 | | |
| II | 4* | −8.961 | 0.288 | 1.639 | 23.525 |
| | 5* | 4.044 | 0.304 | | |
| III | 6* | −1.946 | 0.895 | 1.547 | 56.093 |
| | 7* | −1.031 | 0.044 | | |
| IV | 8* | 1.509 | 0.566 | 1.534 | 55.856 |
| | 9* | 0.779 | 0.600 | | |
| V | 10 | infinity | 0.300 | 1.519 | 64.197 |
| | 11 | infinity | 0.535 | | |
| | IMG | infinity | | | |

TABLE 10

| 5th Embodiment | Surface | R | D | Nd | Vd |
|---|---|---|---|---|---|
| | S1 | infinity | | | |
| I | 2* | 3.2606 | 0.6856 | 1.547 | 56.093 |
| | 3* | −2.0127 | 0.1468 | | |
| II | 4* | −9.0357 | 0.3257 | 1.639 | 23.525 |
| | 5* | 4.1016 | 0.2795 | | |
| III | 6* | −1.9422 | 0.8772 | 1.547 | 56.093 |
| | 7* | −1.0862 | 0.1021 | | |
| IV | 8* | 1.3247 | 0.5190 | 1.534 | 55.856 |
| | 9* | 0.7749 | 0.6000 | | |
| V | 10 | infinity | 0.3000 | 1.519 | 64.197 |
| | 11 | infinity | 0.4893 | | |
| | IMG | infinity | | | |

The focal length "f" and viewing angle "θ" of each lens optical system according to the first through third embodiments corresponding to FIGS. 1 through 5 are shown in Table 11.

TABLE 11

| Classification | Focal length (f) [mm] | Viewing angle (θ) [°] |
|---|---|---|
| 1st Embodiment | 3.160 | 85.0 |
| 2nd Embodiment | 2.962 | 88.6 |
| 3rd Embodiment | 3.044 | 87.1 |

TABLE 11-continued

| Classification | Focal length (f) [mm] | Viewing angle (θ) [°] |
|---|---|---|
| 4th Embodiment | 2.946 | 89.0 |
| 5th Embodiment | 2.868 | 89.0 |

Also, in the lens optical systems according to the first through fifth embodiments of the present invention, an aspherical surface of each lens satisfies the following aspherical surface equation, that is, Equation 5.

$$x = \frac{c'y^2}{1+\sqrt{1-(K+1)c'^2 y^2}} + Ay^4 + By^6 + Cy^8 + Dy^{10} + Ey^{12} \qquad \text{[Equation 5]}$$

In Equation 5, "x" denotes a distance from the apex of a lens in a direction along an optical axis, "y" denotes a distance in a direction perpendicular to the optical axis, "c'" denotes a reciprocal number (=1/r) of a curvature radius at the apex of a lens, "K" denotes a conic constant, and "A", "B", "C", "D", and "E" each denote an aspherical surface coefficient.

Tables 12 through 16 each shows aspherical surface coefficients of aspherical surfaces of the lens optical systems according to the first through third embodiments corresponding to FIGS. 1 through 5. In other words, Tables 12 to 16 each show aspherical coefficients of the incident surfaces 2*, 4*, 6*, and 8* and the exit surfaces 3*, 5*, 7*, and 9* of each lens of Tables 6 through 10.

TABLE 12

| Surface | K | A | B | C | D | E |
|---|---|---|---|---|---|---|
| 2* | −59.7269 | 0.0569 | −0.4450 | 0.5674 | −1.0567 | 1.1287 |
| 3* | 0.0000 | −0.3219 | 0.1640 | −0.2137 | 0.1099 | — |
| 4* | 0.0000 | −0.4362 | −0.0665 | 0.6662 | −0.3853 | — |
| 5* | 0.0000 | −0.1698 | 0.0486 | 0.1081 | −0.1350 | — |
| 6* | −0.6192 | 0.2929 | −0.1859 | 0.2331 | −0.1638 | — |
| 7* | −3.4919 | −0.2560 | 0.2944 | −0.2468 | 0.1687 | −0.0387 |
| 8* | −0.5693 | −0.2097 | 0.0653 | −0.0125 | −0.0016 | 0.0004 |
| 9* | −5.6365 | −0.1063 | 0.0468 | −0.0205 | 0.0063 | −0.0012 |

TABLE 13

| Surface | K | A | B | C | D | E |
|---|---|---|---|---|---|---|
| 2* | −103.0850 | 0.0762 | −0.5933 | 0.8557 | −1.3775 | 1.1287 |
| 3* | 0.0000 | −0.2835 | 0.0814 | −0.0752 | −0.0335 | — |
| 4* | 86.2472 | −0.4146 | 0.0399 | 0.5678 | −0.2984 | — |
| 5* | 0.0000 | −0.1528 | 0.0241 | 0.0982 | −0.0989 | — |
| 6* | −6.1027 | 0.2006 | −0.2245 | 0.2126 | −0.1033 | — |
| 7* | −3.4413 | −0.2172 | 0.2442 | −0.2176 | 0.1607 | −0.0403 |
| 8* | −3.5677 | −0.1881 | 0.0814 | −0.0243 | 0.0039 | −0.0004 |
| 9* | −4.2173 | −0.1159 | 0.0570 | −0.0237 | 0.0064 | −0.0009 |

TABLE 14

| Surface | K | A | B | C | D | E |
|---|---|---|---|---|---|---|
| 2* | −72.8887 | 0.0969 | −0.6064 | 0.8455 | −1.3488 | 1.1287 |
| 3* | 0.0000 | −0.2813 | 0.0582 | −0.0203 | −0.0696 | — |
| 4* | 87.3984 | −0.3624 | 0.1043 | 0.3756 | −0.0888 | — |
| 5* | −72.1638 | −0.0563 | −0.0156 | 0.0866 | −0.0807 | — |

TABLE 14-continued

| Surface | K | A | B | C | D | E |
|---|---|---|---|---|---|---|
| 6* | −2.3395 | 0.2278 | −0.2097 | 0.1911 | −0.1027 | — |
| 7* | −3.4291 | −0.2053 | 0.2397 | −0.2136 | 0.1605 | −0.0406 |
| 8* | −4.2526 | −0.1778 | 0.0790 | −0.0242 | 0.0039 | −0.0002 |
| 9* | −4.3650 | −0.1154 | 0.0568 | −0.0237 | 0.0063 | −0.0009 |

TABLE 15

| Surface | K | A | B | C | D | E |
|---|---|---|---|---|---|---|
| 2* | −67.9505 | 0.1175 | −0.6494 | 0.8913 | −1.3824 | 1.1287 |
| 3* | −2.0090 | −0.265 | 0.0947 | 0.0587 | −0.2450 | — |
| 4* | 95.6557 | −0.2826 | 0.1885 | 0.2726 | −0.2129 | — |
| 5* | −59.5203 | 0.0224 | −0.0887 | 0.1286 | −0.0817 | — |
| 6* | −1.6537 | 0.1754 | −0.2661 | 0.2372 | −0.1095 | — |
| 7* | −3.7708 | −0.2221 | 0.2534 | −0.2391 | 0.1402 | −0.0255 |
| 8* | −3.6567 | −0.2059 | 0.0729 | −0.0133 | 0.0015 | −8.7961e−005 |
| 9* | −2.9943 | −0.1557 | 0.0837 | −0.0329 | 0.0077 | −0.0008 |

TABLE 16

| Surface | K | A | B | C | D | E |
|---|---|---|---|---|---|---|
| 2* | −67.4521 | 0.1255 | −0.6323 | 0.8967 | −1.3604 | 1.1287 |
| 3* | 0.0000 | −0.2528 | 0.0981 | 0.0778 | −0.2618 | — |
| 4* | 94.2683 | −0.2835 | 0.1871 | 0.2594 | −0.2412 | — |
| 5* | −59.0846 | 0.0243 | −0.0875 | 0.1288 | −0.0810 | — |
| 6* | −1.5475 | 0.1752 | −0.2602 | 0.2437 | −0.1028 | — |
| 7* | −4.0812 | −0.2214 | 0.2541 | −0.2390 | 0.1398 | −0.0259 |
| 8* | −2.3005 | −0.2100 | 0.0707 | −0.0133 | 0.0015 | −9.8404e−005 |
| 9* | −2.5670 | −0.1577 | 0.0846 | −0.0328 | 0.0077 | −0.0099 |

Figure 7A:
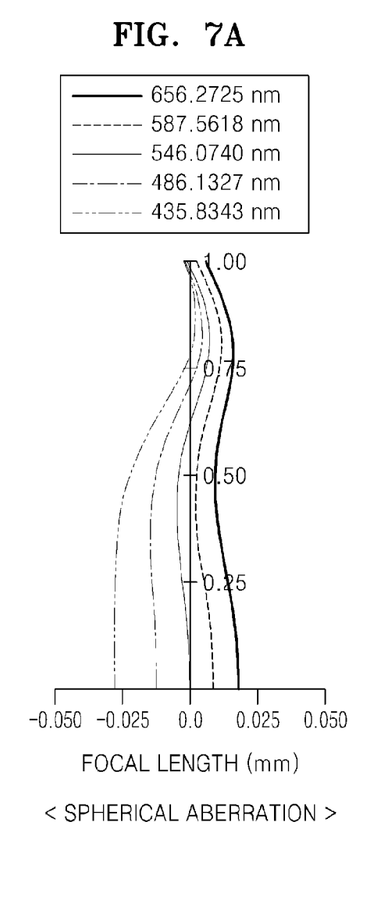
FIGS. 7A, 7B, and 7C are aberration diagrams respectively illustrating longitudinal spherical aberration, astigmatic field curvature, and distortion of the lens optical system of FIG. 1.
Figure 7B:
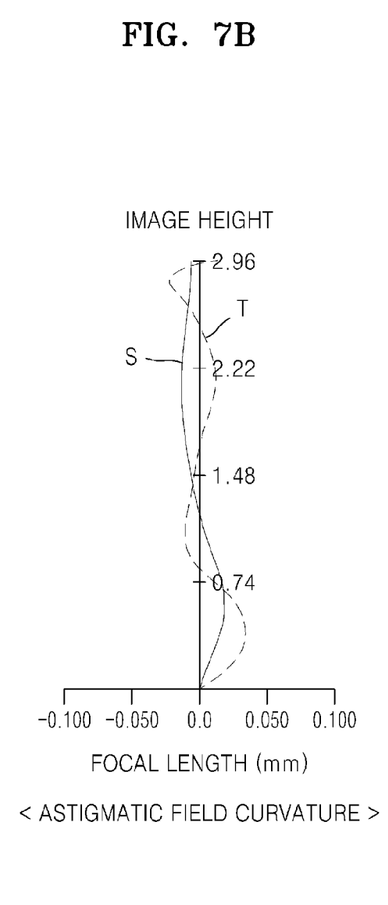
Figure 7C:
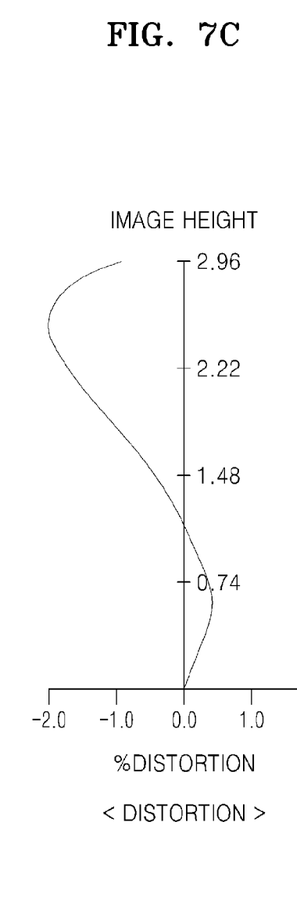

FIGS. 7A, 7B, and 7C are aberration diagrams respectively illustrating longitudinal spherical aberration, astigmatic field curvature, and distortion of the lens optical system of FIG. 1, that is, the lens optical system having the values of Table 6.

FIG. 7A illustrates spherical aberration of the lens optical system with respect to lights having various wavelengths. FIG. 7B illustrates astigmatic field curvature of the lens optical system, that is, a tangential field curvature T and a sagittal field curvature S. The wavelengths of light used to obtain data of FIG. 7A are 435.8343 nm, 486.1327 nm, 546.0740 nm, 587.5618 nm, and 656.2725 nm. The wavelength of light used to obtain data of FIGS. 7B and 7C is 546.0740 nm. The same conditions are applied to the lens optical systems of FIGS. 8 through 11.

Figure 8A:
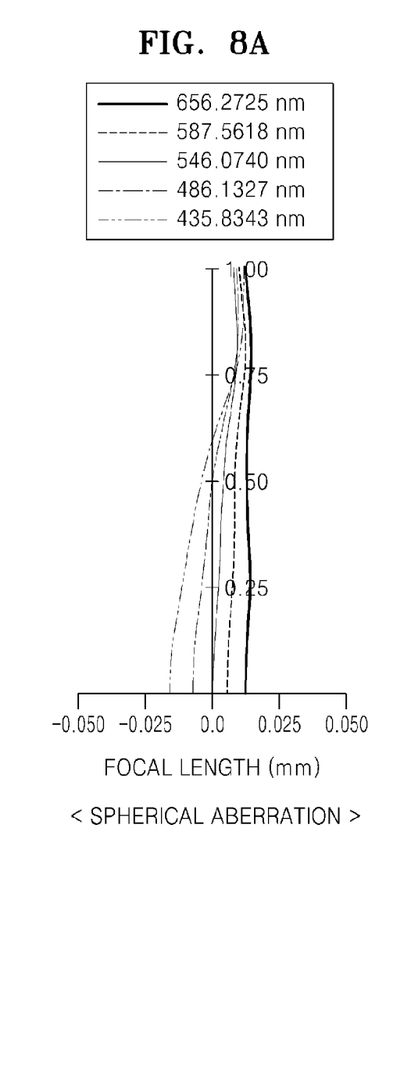
FIGS. 8A, 8B, and 8C are aberration diagrams respectively illustrating longitudinal spherical aberration, astigmatic field curvature, and distortion of the lens optical system of FIG. 2.
Figure 8B:
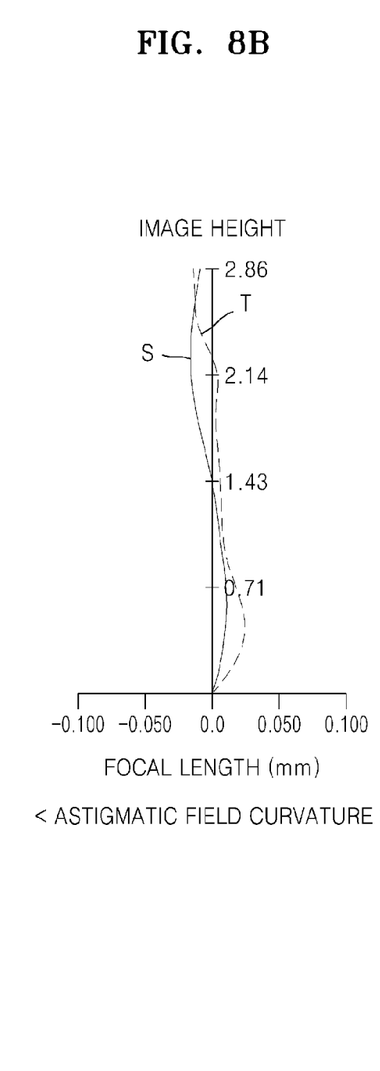
Figure 8C:
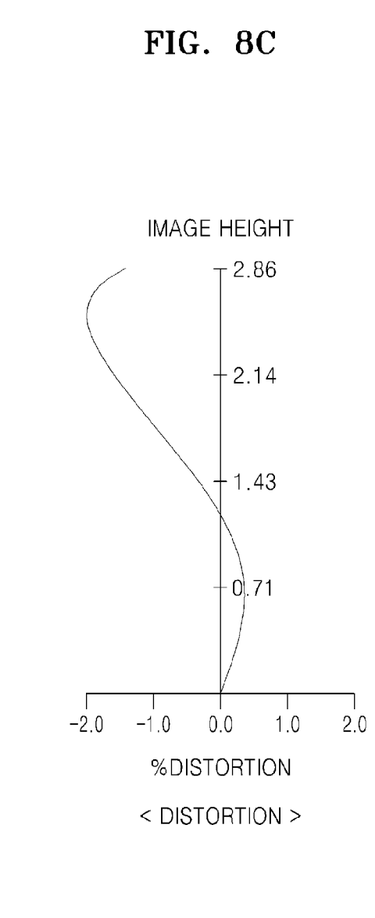

FIGS. 8A, 8B, and 8C are aberration diagrams respectively illustrating longitudinal spherical aberration, astigmatic field curvature, and distortion of the lens optical system of FIG. 2, that is, the lens optical system having the values of Table 7.

Figure 9A:
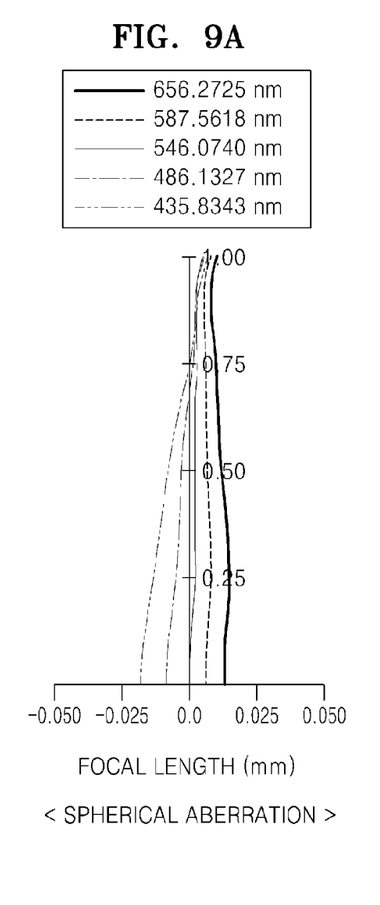
FIGS. 9A, 9B, and 9C are aberration diagrams respectively illustrating longitudinal spherical aberration, astigmatic field curvature, and distortion of the lens optical system of FIG. 3.
Figure 9B:
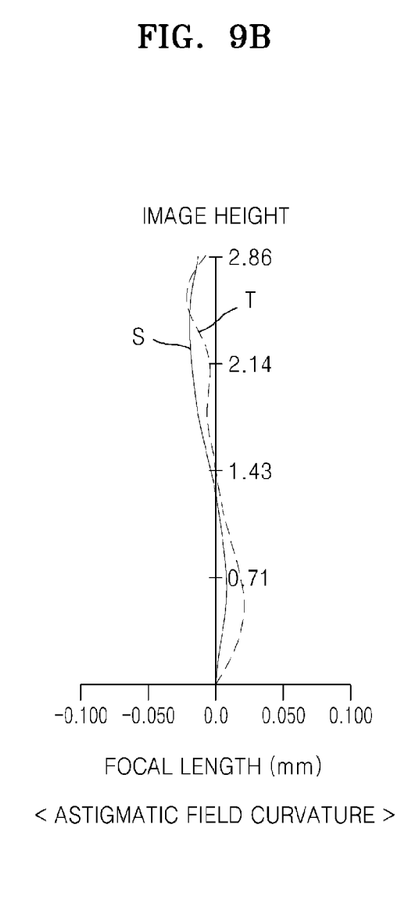
Figure 9C:
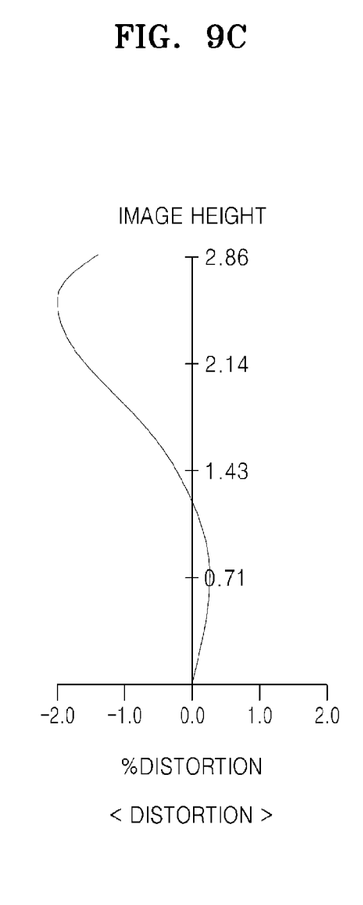

FIGS. 9A, 9B, and 9C are aberration diagrams respectively illustrating longitudinal spherical aberration, astigmatic field curvature, and distortion of the lens optical system of FIG. 3, that is, the lens optical system having the values of Table 8.

Figure 10A:
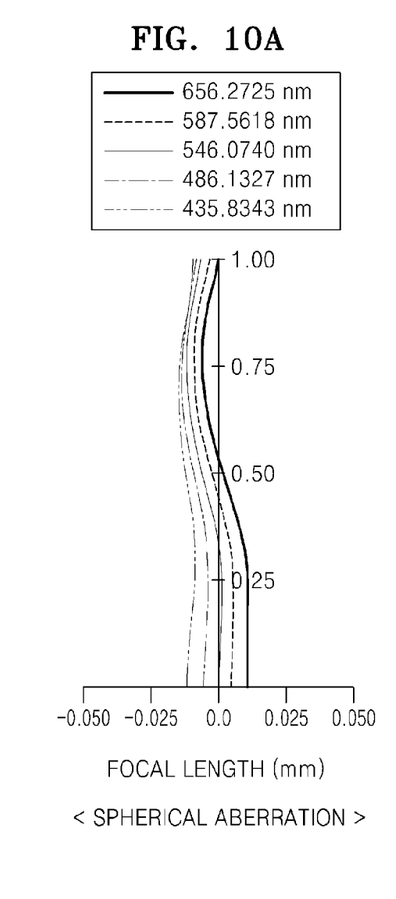
FIGS. 10A, 10B, and 10C are aberration diagrams respectively illustrating longitudinal spherical aberration, astigmatic field curvature, and distortion of the lens optical system of FIG. 4.
Figure 10B:
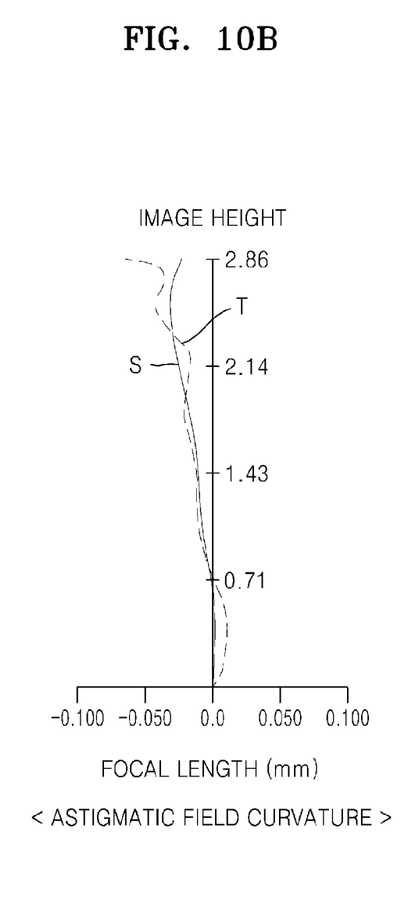
Figure 10C:
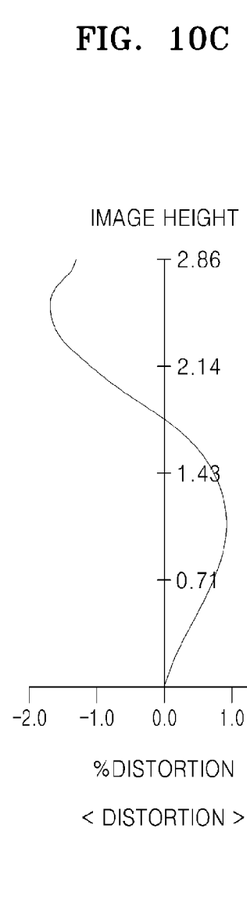

FIGS. 10A, 10B, and 10C are aberration diagrams respectively illustrating longitudinal spherical aberration, astigmatic field curvature, and distortion of the lens optical system of FIG. 4, that is, the lens optical system having the values of Table 9.

Figure 11A:
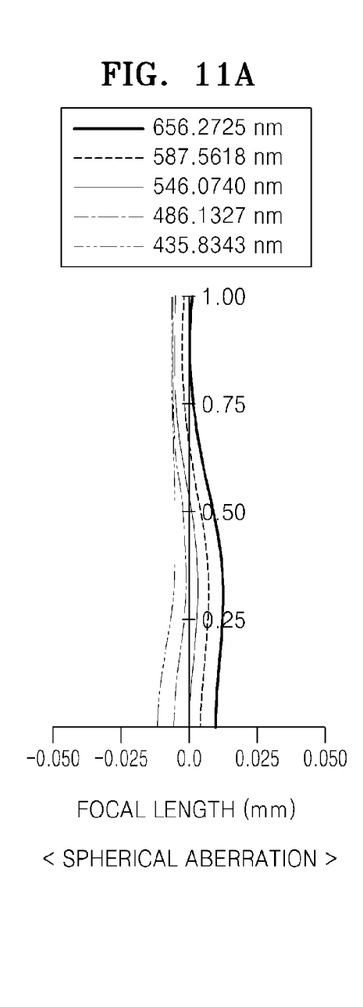
FIGS. 11A, 11B, and 11C are aberration diagrams respectively illustrating longitudinal spherical aberration, astigmatic field curvature, and distortion of the lens optical system of FIG. 5.
Figure 11B:
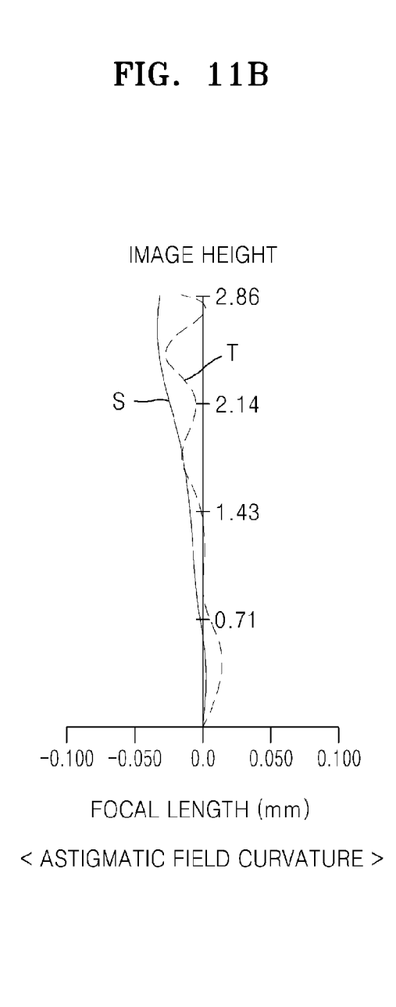
Figure 11C:
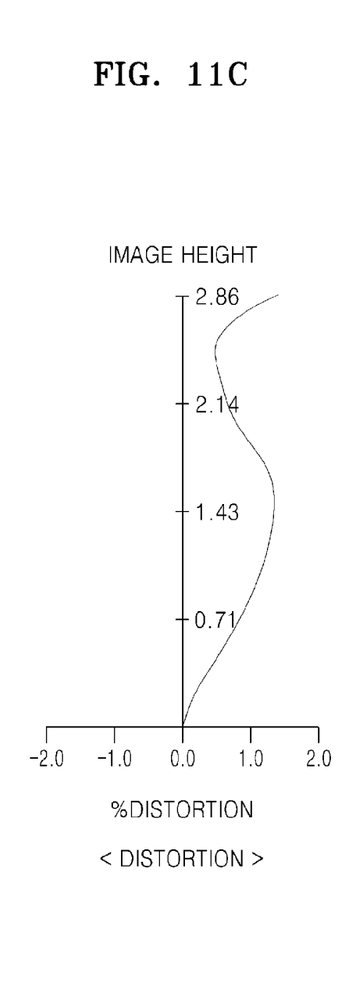

FIGS. 11A, 11B, and 11C are aberration diagrams respectively illustrating longitudinal spherical aberration, astigmatic field curvature, and distortion of the lens optical system of FIG. 5, that is, the lens optical system having the values of Table 10.

As described above, the lens optical systems according to the embodiments of the present invention each may include the first to fourth lenses I-IV respectively having positive (+), negative (−), positive (+), and negative (−) refractive powers that are arranged in order from the object OBJ side toward the image sensor IMG side, and may satisfy at least any one of Inequalities 1 to 3 and/or one of Inequalities 4-1 and 4-2. The lens optical system having four lenses may have a short total length and a small effective outer diameter of about 4.0 mm or less. Also, the lens optical system may have a large viewing angle of about 85° or more, and may easily (well) correct various aberrations. Thus, according to the present invention, a lens optical system that is compact and lightweight and has a wide viewing angle and high resolution may be embodied. Furthermore, as described above, since the first to fourth lenses I-IV may be formed of plastic and at least one of two surfaces, that is, an incident surface and an exit surface, of each lens may be formed as an aspherical surface, a compact lens optical system with superior performance may be embodied at a low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, it can be seen that those skilled in the art may easily obtain the above-described effect when at least one of Inequalities 1 through 3 and/or one of Inequalities 4-1 and 4-2 are satisfied even if the shapes of the lenses in the lens optical system according to the embodiments of the present invention are slightly modified. In addition, it can be seen that a blocking film may be used as the infrared blocking unit V instead of a filter. Therefore, the scope of the invention is defined not by the detailed description of the invention but by the appended claims.

What is claimed is:

1. A lens optical system comprising first, second, third, and fourth lenses that are arranged between an object and an image sensor where an image of the object is formed, in order from a side of the object,
wherein the first lens has a positive (+) refractive power and both surfaces thereof are convex, the second lens has a negative (−) refractive power and both surfaces thereof are concave, the third lens has a positive (+) refractive power and has a meniscus shape that is convex toward the image sensor, and the fourth lens has a negative (−) refractive power and at least one of an incident surface and an exit surface thereof is an aspherical surface,
wherein the lens optical system satisfies the following inequalities, $|SAG1|>|SAG2|$, $1.3<f/D4<1.7$, and $BFL>1.5$, wherein SAG1 is a sagittal depth of an incident surface of the second lens along an optical axis, SAG2 is a sagittal depth of an exit surface of the second lens along the optical axis, f is a focal length of the lens optical system, D4 is an effective radius of an exit surface of the fourth lens, and BFL is a distance from the exit surface of the fourth lens to the image sensor.

2. The lens optical system of claim 1, wherein a viewing angle (θ) of the lens optical system satisfies the following inequality, $0.9<|\tan(\theta/2)|<1.2$.

3. The lens optical system of claim 1, wherein a curvature radius R1 of an incident surface of the first lens and a curvature radius R2 of an exit surface of the first lens satisfy the following inequality, $1.1<|R1/R2|<1.8$.

4. The lens optical system of claim 2, wherein a curvature radius R1 of an incident surface of the first lens and a curvature radius R2 of an exit surface of the first lens satisfy the following inequality, $1.1<|R1/R2|<1.8$.

5. A lens optical system comprising first, second, third, and fourth lenses that are arranged between an object and an image sensor where an image of the object is formed, in order from a side of the object,
wherein the first lens has a positive (+) refractive power and both surfaces thereof are convex, the second lens has a negative (−) refractive power and both surface thereof are concave, the third lens has a positive (+) refractive power and has a meniscus shape that is convex toward the image sensor, and the fourth lens has a negative (−) refractive power and at least one of an incident surface and an exit surface thereof is an aspherical surface,
wherein the lens optical system satisfies the following enequalities, $|SAG1|>|SAG2|$, $1.0<f/D4>1.3$, and $BFL>1.5$, wherein SAG1 is a sagittal depth of an incident surface of the second lens along an optical axis, SAG2 is a sagittal depth of an exit surface of the second lens along the optical axis, f is a focal length of the lens optical system, D4 is an effective radius of an exit surface of the fourth lens, and BFL is a distance from the exit surface of the fourth lens to the image sensor.

6. The lens optical system of claim 1, wherein at least one of the first to third lenses is an aspherical lens.

7. The lens optical system of claim 1, wherein at least one of an incident surface and an exit surface of at least one of the first to third lenses is an aspherical surface.

8. The lens optical system of claim 1, wherein at least one of an incident surface and an exit surface of the fourth lens has at least one inflection point between a center portion and an edge thereof.

9. The lens optical system of claim 8, wherein the incident surface of the fourth lens is convex toward the object at the center portion thereof and concave toward the object around the center portion, and the exit surface of the fourth lens is concave toward the image sensor at the center portion thereof and convex toward the image sensor around the center portion.

10. The lens optical system of claim 1, further comprising an aperture diaphragm between the object and the first lens.

11. The lens optical system of claim 1, further comprising an infrared blocking unit between the fourth lens and the image sensor.

12. The lens optical system of claim 1, wherein at least one of the first to fourth lenses is a plastic lens.

13. A lens optical system comprising first, second, third, and fourth lenses that are arranged between an object and an image sensor where an image of the object is formed, in order from a side of the object, wherein the first, second, third, and fourth lenses have positive (+), negative (−), positive (+), and negative (−) refractive powers, respectively, and wherein the lens optical system satisfies the following inequalities, $|SAG1|>|SAG2|$, $|R1|>|R2|$, and $0.9<|\tan(\theta/2)|<1.2$, wherein SAG1 is a sagittal depth of an incident surface of the second lens along an optical axis, SAG2 is a sagittal depth of an exit surface of the second lens along the optical axis, R1 is a curvature radius of an incident surface of the first lens, R2 is a curvature radius of an exit surface of the first lens, and θ is a viewing angle of the lens optical system.

14. The lens optical system of claim 13, wherein the lens optical system further satisfies the following inequalities, $1.3<f/D4<1.7$, and $BFL>1.5$, wherein f is a focal length of the lens optical system, D4 is an effective radius of an exit surface of the fourth lens, and BFL is a distance from the exit surface of the fourth lens to the image sensor.

15. The lens optical system of claim 13, wherein the lens optical system further satisfies the following inequalities, $1.0<f/D4<1.3$, and $BFL<1.5$, wherein f is a focal length of the lens optical system, D4 is an effective radius of an exit surface of the fourth lens, and BFL is a distance from the exit surface of the fourth lens to the image sensor.

16. The lens optical system of claim 13, wherein the first lens is a biconvex lens, the second lens is a biconcave lens, the third lens is convex toward the image sensor, and the fourth lens is an aspherical lens.

17. The lens optical system of claim 13, wherein the viewing angle (θ) of the lens optical system is about 85° or greater.

* * * * *